United States Patent
Gomez et al.

(10) Patent No.: US 11,257,477 B2
(45) Date of Patent: Feb. 22, 2022

(54) MOTOR NOISE MASKING

(71) Applicant: Harman International Industries, Incorporated, Stamford, CT (US)

(72) Inventors: Antonio Gomez, Hazel Park, MI (US); Kevin J. Bastyr, Franklin, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 153 days.

(21) Appl. No.: 16/823,239

(22) Filed: Mar. 18, 2020

(65) Prior Publication Data

US 2021/0295817 A1 Sep. 23, 2021

(51) Int. Cl.
*G10K 15/02* (2006.01)
*H04R 1/02* (2006.01)
*B60R 11/02* (2006.01)
*G10L 25/51* (2013.01)

(52) U.S. Cl.
CPC .......... *G10K 15/02* (2013.01); *B60R 11/0217* (2013.01); *G10L 25/51* (2013.01); *H04R 1/025* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 9,271,073 B2* | 2/2016 | Valeri | G10K 15/02 |
| 10,065,561 B1 | 9/2018 | Bastyr et al. | |
| 10,112,534 B2 | 10/2018 | Hera et al. | |
| 10,224,017 B2 | 3/2019 | Lee et al. | |
| 10,319,360 B1 | 6/2019 | He et al. | |
| 2015/0131808 A1* | 5/2015 | Lennstrom | G10K 11/1752 381/73.1 |
| 2021/0289286 A1* | 9/2021 | Marin | H04R 1/20 |

* cited by examiner

*Primary Examiner* — Paul W Huber
(74) *Attorney, Agent, or Firm* — Brooks Kushman P.C.

(57) ABSTRACT

A sound synthesis system is provided with a loudspeaker to project sound indicative of synthesized motor sound in response to receiving a synthesized sound (SS) signal, and a processor. The processor is programmed to: estimate motor sound based on a sensor signal indicative of sound present within a passenger compartment; identify a dominant motor harmonic of the motor sound with an amplitude and a frequency; determine an enrichment value of the motor sound; determine if the motor sound is unenriched based on a comparison of the enrichment value to an enrichment threshold value; generate at least one additional motor harmonic with a first frequency that is different than the frequency of the dominant motor harmonic in response to the motor sound being unenriched; and provide the SS signal to the loudspeaker, wherein the SS signal is indicative of the at least one additional motor harmonic.

20 Claims, 6 Drawing Sheets

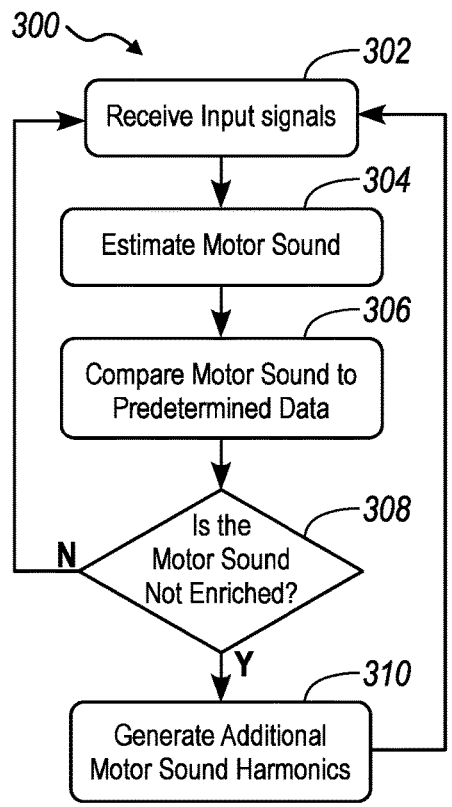

FIG. 3

| Interval | Equal Temperament Frequency Ratio |
|---|---|
| Unison | $(\sqrt[12]{2})^{0} \simeq 1.0000$ |
| Minor Second | $(\sqrt[12]{2})^{1} \simeq 1.0595$ |
| Major Second | $(\sqrt[12]{2})^{2} \simeq 1.1225$ |
| Minor Third | $(\sqrt[12]{2})^{3} \simeq 1.1892$ |
| Major Third | $(\sqrt[12]{2})^{4} \simeq 1.2599$ |
| Perfect Fourth | $(\sqrt[12]{2})^{5} \simeq 1.3348$ |
| Tritone | $(\sqrt[12]{2})^{6} \simeq 1.4142$ |
| Perfect Fifth | $(\sqrt[12]{2})^{7} \simeq 1.4983$ |
| Minor Sixth | $(\sqrt[12]{2})^{8} \simeq 1.5874$ |
| Major Sixth | $(\sqrt[12]{2})^{9} \simeq 1.6818$ |
| Minor Seventh | $(\sqrt[12]{2})^{10} \simeq 1.7818$ |
| Major Seventh | $(\sqrt[12]{2})^{11} \simeq 1.8897$ |
| Octave | $(\sqrt[12]{2})^{12} \simeq 2.0000$ |

FIG. 5

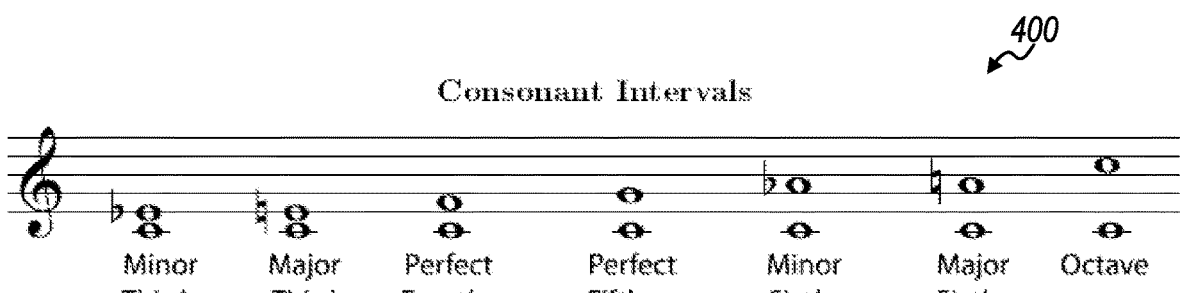

FIG. 4A

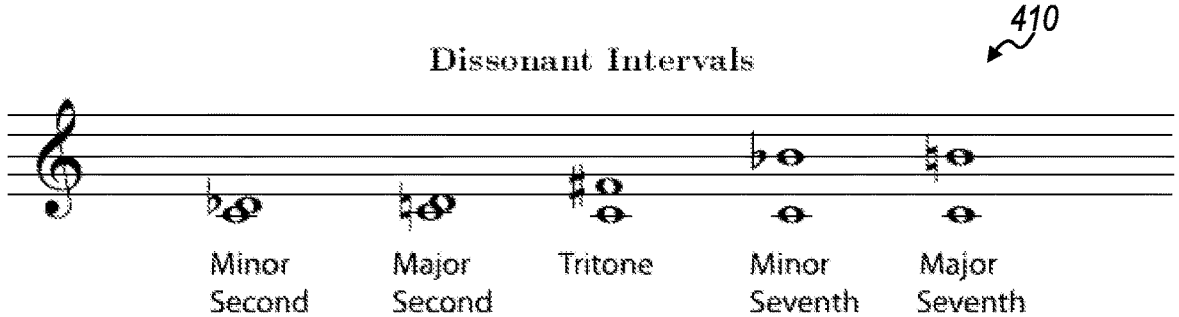

FIG. 4B

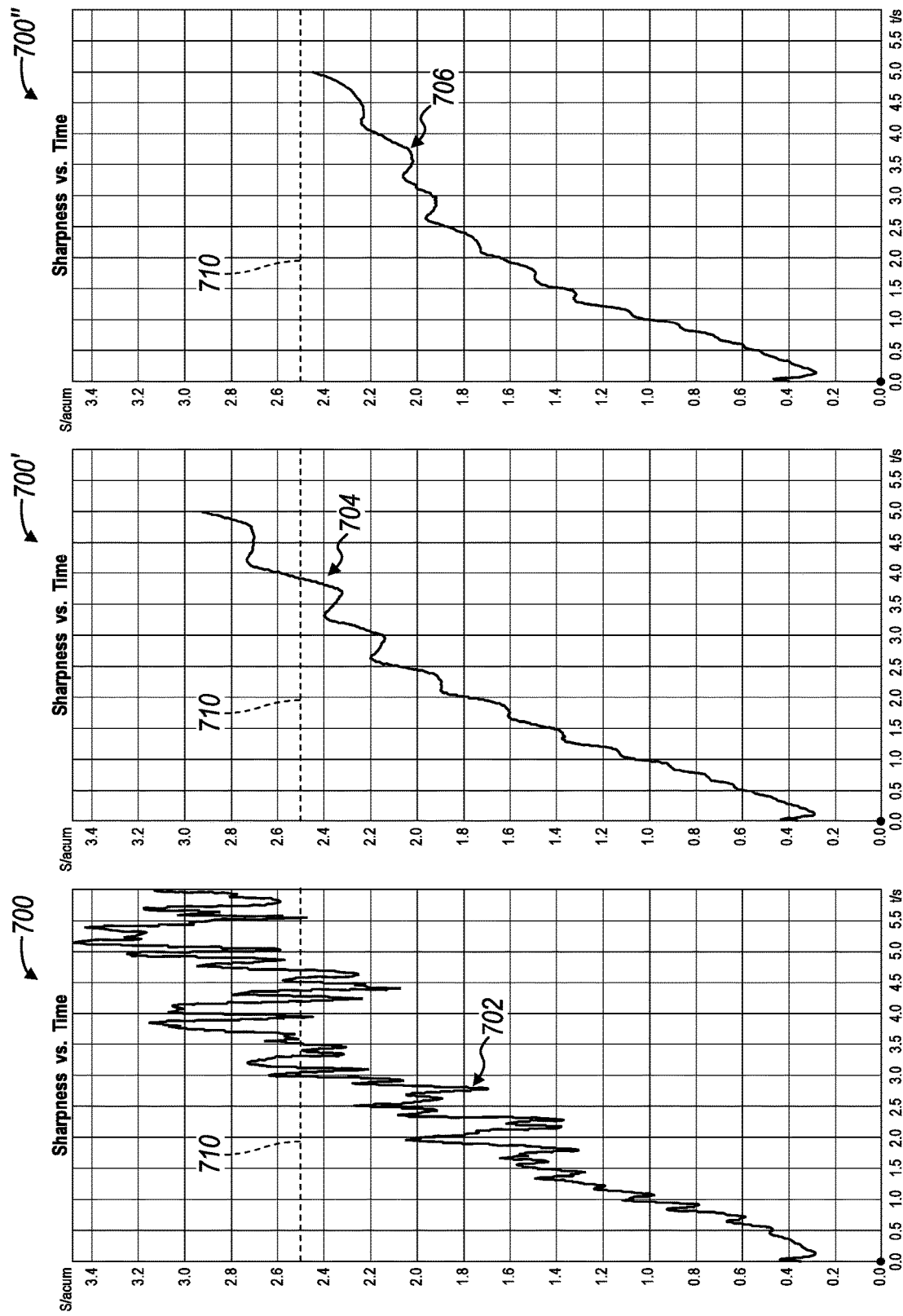

MOTOR NOISE MASKING

TECHNICAL FIELD

One or more embodiments relate to a vehicle system and method for masking sound generated by an electric traction motor of an electrified vehicle.

BACKGROUND

Vehicle components generate noise that is typically audible to a driver and any passengers within the passenger compartment. For example, a driver may hear noise generated by an engine of a powertrain and an exhaust system of the vehicle. The natural sound of electrified vehicles, e.g., hybrid electric vehicles (HEV) and electric vehicles (EV), is different from the natural sound of vehicles with internal combustion engines. For example, an HEV may operate as an EV with the internal combustion engine (ICE) off, during which the HEV does not generate typical engine noise. While drivers may be accustomed to hearing cues regarding vehicle operation from an internal combustion engine (e.g., low frequency rumble and increased sound levels and pitch as vehicle or engine speed increases), an electric traction motor has a relatively quiet, relatively high frequency whine under most conditions. However, a driver may be able to perceive other noises of an electrified vehicle that are not perceptible during normal operation of an internal combustion engine-driven vehicle. For example, sound emitted from the tires, suspension, general vehicle noise, vibration, harshness (NVH) for systems other than the drivetrain, and high frequency electric motor whine may be apparent during typical driving conditions.

SUMMARY

In one embodiment, a sound synthesis system is provided with a loudspeaker to project sound indicative of synthesized motor sound within a passenger compartment of a vehicle in response to receiving a synthesized sound (SS) signal and a processor. The processor is programmed to: estimate motor sound based on a sensor signal indicative of sound present within the passenger compartment; identify a dominant motor harmonic of the motor sound with an amplitude and a frequency; determine an enrichment value of the motor sound; determine if the motor sound is unenriched based on a comparison of the enrichment value to an enrichment threshold value; generate at least one additional motor harmonic with a first frequency that is different than the frequency of the dominant motor harmonic in response to the motor sound being unenriched; and provide the SS signal to the loudspeaker, wherein the SS signal is indicative of the at least one additional motor harmonic.

In another embodiment, a vehicle sound synthesis system is provided with a loudspeaker to project sound indicative of synthesized motor sound within a passenger compartment of a vehicle in response to receiving a synthesized sound (SS) signal, a microphone to provide a microphone signal indicative of sound present within the passenger compartment, and a controller configured to: estimate motor sound based on the microphone signal; identify a dominant motor harmonic of the motor sound with an amplitude and a frequency; determine an enrichment value of the motor sound; determine if the motor sound is unenriched based on a comparison of the enrichment value of the motor sound to an enrichment threshold value; generate at least one additional motor harmonic with a first frequency that is less than the frequency of the dominant motor harmonic in response to the motor sound being unenriched; and provide the SS signal to the loudspeaker, wherein the SS signal is indicative of the at least one additional motor harmonic.

In yet another embodiment, a computer-program product embodied in a non-transitory computer readable medium that is programmed for synthesizing motor sound is provided. The computer-program product comprises instructions for: receiving a sensor signal indicative of sound present within a vehicle passenger compartment; estimating motor sound based on the sensor signal; identifying a dominant motor harmonic of the motor sound with an amplitude and a frequency; generating at least one additional motor harmonic with a first frequency that is less than the frequency of the dominant motor harmonic in response to the motor sound being unenriched; and providing a synthesized sound (SS) signal to a loudspeaker to project as sound within the vehicle passenger compartment, wherein the SS signal is indicative of the at least one additional motor harmonic.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 3 is a flow chart illustrating a method for generating synthetic motor sound according to one or more embodiments.

FIG. 4A is a scale illustrating consonant sound intervals.

FIG. 4B is a scale illustrating dissonant sound intervals.

FIG. 5 is a table listing frequency ratios for equal temperament.

FIGS. 7A-7C are graphs illustrating the sharpness of the motor sounds illustrated in FIGS. 6A-6C as determined by the vehicle system of FIG. 1.

DETAILED DESCRIPTION

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
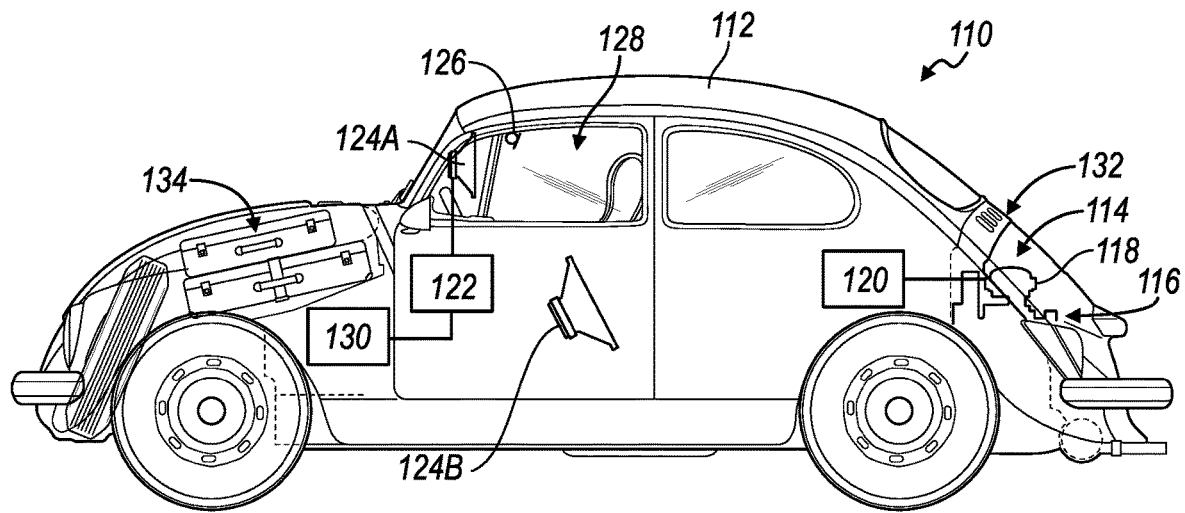
FIG. 1 is a schematic diagram of a vehicle system for generating simulated vehicle sound according to one or more embodiments, illustrated with an electrified vehicle.

With reference to FIG. 1, a vehicle system for generating simulated vehicle sound is illustrated in accordance with one or more embodiments and generally represented by numeral 110. The vehicle system 110 is depicted within a vehicle 112. The vehicle 112 includes a powertrain 114 with a transmission 116, an internal combustion engine (ICE) 118, and an electric traction motor 120. The vehicle system 110 includes a controller 122, multiple loudspeakers 124 (124A, 124B), and at least one microphone 126. In an embodiment, the vehicle system 110 includes only one loudspeaker 124A.

The illustrated embodiment depicts a vehicle system 110 with a first loudspeaker 124A mounted forward in a passenger compartment 128, a second low frequency loudspeaker 124B mounted to a door, and a microphone 126 mounted to a headliner in the passenger compartment 128. Traction motors for electrified vehicles, such as the motor 120, typically generate high-frequency motor noise or whine at or above 1 kHz. Further, such motors typically generate one high-frequency noise order, which due to the harmonic sparsity, and hence lack of richness and fullness, results in harsh, unpleasant and unenriched motor sound. The vehicle system 110 analyzes the high-frequency noise or fundamental whine of the motor 120 present in the passenger compartment 128; determines if the noise is unenriched; and if so, generates additional lower frequency harmonics to add to the motor sound to collectively modify and increase the enrichment of the motor sound.

The controller 122 communicates with other vehicle systems and controllers via one or more vehicle networks 130 by wired or wireless communication. The vehicle network 130 can include a plurality of channels for communication. One possible channel of the vehicle network is a serial bus such as a Controller Area Network (CAN). Another possible channel of the vehicle network includes an Ethernet network defined by Institute of Electrical and Electronics Engineers (IEEE) 802 family of standards. Additional channels of the vehicle network may include discrete connections between modules and may include power signals. Different signals may be transferred over different channels of the vehicle network. For example, video signals may be transferred over a high-speed channel (e.g., Ethernet) while guiding signals may be transferred over CAN or discrete signals. The vehicle network may include any hardware and software components that aid in transferring signals and data between modules and controllers.

Although the controller 122 is shown as a single controller, it may contain multiple controllers, or it may be embodied as software code within one or more other controllers. The controller 122 generally includes any number of microprocessors, ASICs, ICs, memory (e.g., FLASH, ROM, RAM, EPROM and/or EEPROM) and software code to co-act with one another to perform a series of operations. Such hardware and/or software may be grouped together in modules to perform certain functions. Any one or more of the controllers or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. The controller 122 also includes predetermined data, or "look up tables" that are stored within the memory, according to one or more embodiments.

Figure 2:
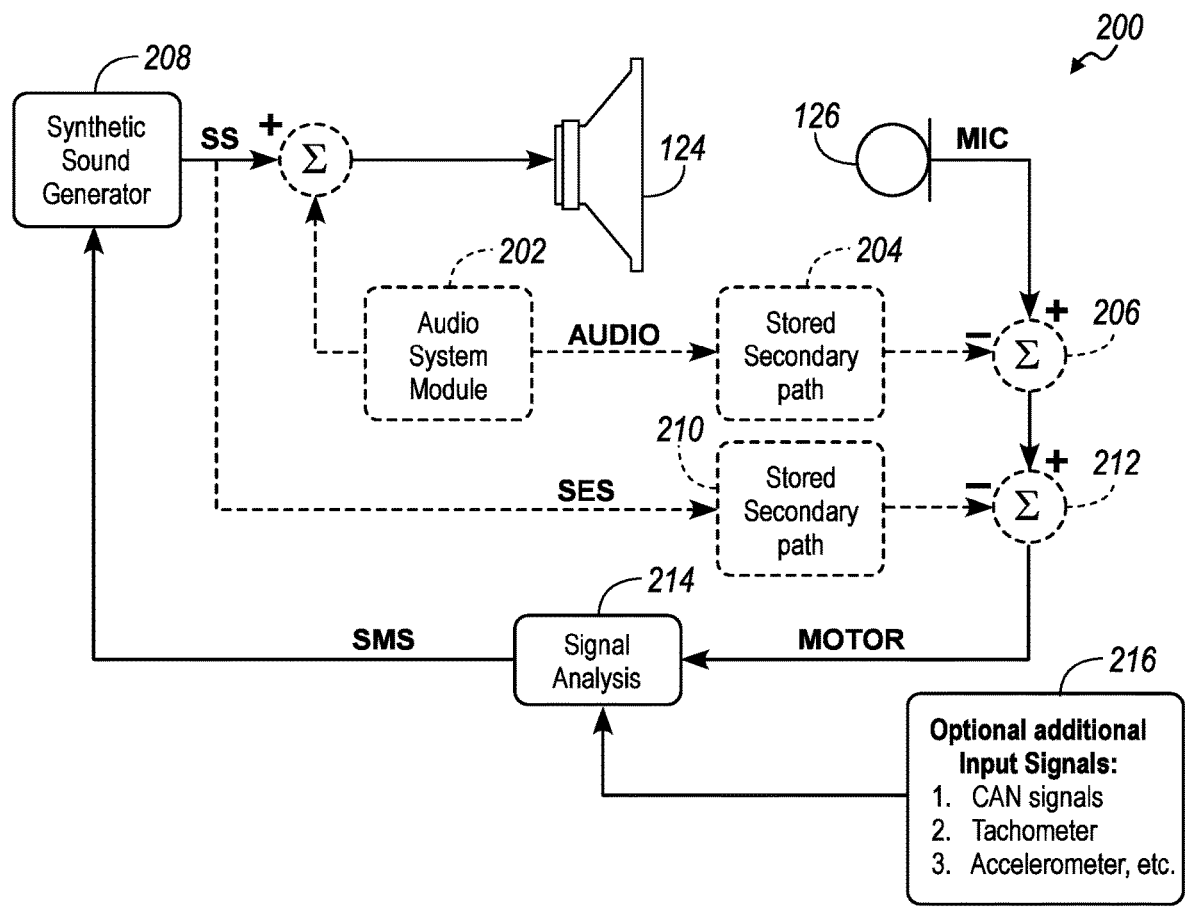
FIG. 2 is a schematic block diagram of the vehicle system of FIG. 1.

FIG. 2 is a block diagram 200 illustrating aspects of the vehicle system 110 according to one or more embodiments. The vehicle system 110 generates the synthetic motor sound based on multiple signals that are indicative of present vehicle conditions, and predetermined information. The microphone 126 measures the sound present in its proximity and provides a corresponding signal (MIC). The microphone 126 is located in the passenger compartment 128, according to the embodiment illustrated in FIG. 1. However other embodiments of the vehicle system 110 can instead include a microphone 126 located in a rear cargo compartment 132, i.e., a trunk, or in a front cargo compartment 134, i.e., a "frunk," or in another location of the vehicle 112. The sound present on the MIC signal will vary depending on the location of the microphone 126. For example, a microphone 126 that is located in the passenger compartment 128 will detect motor sound and additional sound e.g., music, from a vehicle audio system, synthesized sound, and speech from passengers; whereas microphones located in a trunk or frunk may not detect such additional sounds. The vehicle system 110 is designed to analyze the high frequency motor whine, however other sound may be present in the MIC signal, therefore in one or more embodiments, the vehicle system 110 cancels, or reduces the amplitudes of such signals present in the MIC signal. In other embodiments, the vehicle system estimates motor sound from the MIC signal and/or signals provided by other sensors, e.g., accelerometers, force gauges, geophones, linear variable differential transformers, strain gauges, and load cells.

In one embodiment, the vehicle system 110 includes an audio system module 202 that provides an AUDIO signal to the loudspeaker 124 for emitting corresponding sound, e.g., music. The audio system module 202 also provides the AUDIO signal along a stored secondary path 204, which the vehicle system 110 uses to cancel, or reduce the amplitude of, the AUDIO component from the MIC signal, as illustrated by summation block 206. In an embodiment, an adaptive system, such as a least mean squares (LMS) system can also be used to provide an estimate of the secondary path 204, in place of using the stored secondary path.

The vehicle system 110 includes a synthetic sound generator module 208 for generating synthesized sound (SS) to mask or cancel natural sound, such as motor sound and/or engine sound. The SS includes synthesized motor sound (SMS) to mask or augment the natural motor sound. In one or more embodiments, the SS also includes synthesized engine sound (SES) to mask or augment the natural engine sound. The synthetic sound generator module 208 uses sine tone generators, oscillators, modulated way players or broad-band noise to generate the SS. In one or more embodiments, the vehicle system 110 cancels or reduces the amplitude of the synthesized engine sound (SES) component of the overall SS signal, by providing the (SES) signal along a feedforward stored secondary path 210, as illustrated by summation block 212.

The vehicle system 110 includes a signal analysis module 214 that analyzes the MIC signal that is indicative of the motor sound (MOTOR). As described above, in some embodiments, the vehicle system 110 filters the MIC signal to remove the AUDIO and SES components from the signal. The signal analysis module 214 analyzes the MOTOR signal, with reference to one or more other vehicle signals 216, e.g., motor speed, engine speed, vehicle speed, pedal position, driveshaft speed, vehicle acceleration, etc., that are received from other systems, to determine whether or not MOTOR is an unenriched sound. If MOTOR is unenriched, the signal analysis module 214 instructs the synthetic sound generator module 208 to generate additional high-frequency synthetic sound ($SS_{HF}$) to mask, or enrich, the unenriched motor sound.

With reference to FIG. 3, a method for masking high-frequency motor noise is illustrated according to one or more embodiments and generally referenced by numeral 300. The method is implemented using software code contained with the controller 122 according to one or more embodiments. While the method is described using flowcharts that are illustrated with a number of sequential steps, one or more steps may be omitted and/or executed in another manner in one or more other embodiments.

At step 302 the vehicle system 110 receives input signals from within the vehicle system 110 itself, such as the MIC signal, and signals provided by other vehicle systems. At step 304, the vehicle system 110 estimates the motor sound. The vehicle system 110 optionally cancels, or reduces the amplitude of, non-motor components present on MIC signal, e.g., music and synthetic engine sound to filter the remaining motor sound (MOTOR) as described above with reference to FIG. 2.

At steps 306-308, the vehicle system 110 compares the motor sound and statistics derived from the motor sound to predetermined data to determine if it is unenriched. Motor enrichment (Er) refers to a complex sensation that is influenced by multiple psychoacoustic components. In one or more embodiments, the vehicle system 110 determines an absolute enrichment (Er) of the motor sound based on an inverse of roughness ($R^{-1}$), sharpness (S), tonality (T), and loudness (N) according to Equation 1:

$$Er=(1-e^{-0.7R})*e^{-1.08S}*(1.24-e^{-2.43T})*e^{-(0.023N)^2} \quad (1)$$

The absolute enrichment value refers to the actual magnitude of a calculated enrichment value, irrespective of its relation to other enrichment values.

In one or more embodiments, the vehicle system 110 may also determine the relative enrichment value ($Er/Er_0$) of the motor sound based on an inverse of roughness ($R^{-1}$), sharpness (S), tonality (T), and loudness (N) according to Equation 2:

$$\frac{Er}{Er_0} = \left(1 - e^{-\frac{0.7R}{R_0}}\right) * e^{-\frac{1.08S}{S_0}} * \left(1.24 - e^{-\frac{2.43T}{T_0}}\right) * e^{-\left(\frac{0.023N}{N_0}\right)^2} \quad (2)$$

The vehicle system 110 compares the absolute value for each component to a nominal value to determine its relative value. For example, the vehicle system 110 determines nominal enrichment ($Er_0$), then compares the absolute enrichment (Er) to nominal enrichment ($Er_0$) to determine relative enrichment ($Er/Er_0$). The nominal values are based on the passenger compartment acoustics before the vehicle system 110 generates additional sound. In other embodiments, the vehicle system 110 determines enrichment based on a subset of these sound quality components, i.e., absolute or relative inverse roughness ($R^{-1}$), sharpness (S), tonality (T), and/or loudness (N).

At step 308, the vehicle system 110 compares the absolute enrichment value (or relative enrichment value) to a predetermined enrichment threshold to determine if the motor sound is unenriched.

In one embodiment, the vehicle system 110 determines if the motor sound is unenriched based on sharpness (S) alone at steps 306-308. Sharpness is a measure of the high frequency content of a sound, the greater the proportion of high frequencies the "sharper" the sound. Sharpness is the most influential factor on motor enrichment. The vehicle system 110 determines the sharpness of the motor sound (MOTOR) by analyzing the spectral content and the center frequency of the sound within a narrow frequency band.

The vehicle system 110 determines the sharpness (S) of the MOTOR signal in the passenger compartment 128 using the Acum scale. One Acum is narrow-band noise that is one critical band wide at a center frequency of 1 k Hz having a level of 60 dB. Critical bands are determined in the Bark scale, which is a frequency scale in which equal distances correspond with perceptually equal distances. The vehicle system 110 calculates the sharpness (S) of the MOTOR signal based on specific loudness N' as shown in Equation 3:

$$S = 0.11 \frac{\int_0^{24Bark} N'g(z)zdz}{\int_0^{24Bark} N'dz} acum \quad (3)$$

In other embodiments, the vehicle system 110 may use other psychoacoustically similar, but numerically different, formulations of sharpness.

Specific loudness (N') is based on the assumption that a relative change in loudness is proportional to a relative change in intensity. The vehicle system 110 measures the loudness (N) of the motor sound using the microphones 126. Loudness corresponds to the subjective sound intensity of a stimulus and is measured in sones. One sone is equal to the level of a 40 dB of a 1-kHz tone. The vehicle system then calculates the specific loudness (N') of the motor sound based on excitation (E), test-tone excitation ($E_{TQ}$), and an excitation that corresponds to a reference intensity ($E_0$) in the G-index ($SONE_G$) as shown in Equation 4:

$$N' = 0.08\left(\frac{E_{TQ}}{E_0}\right)^{0.23}\left[\left(0.5 + 0.5\frac{E}{E_{TQ}}\right)^{0.23} - 1\right]\frac{SONE_G}{Bark} \quad (4)$$

In other embodiments, the vehicle system 110 may use other psychoacoustically similar, but numerically different, formulations of loudness.

The vehicle system 110 determines the absolute sound enrichment (Er) of the motor sound based on the absolute sharpness (S) according to Equation 5:

$$Er=e^{-1.08 \cdot S} \quad (5)$$

In an additional embodiment, the vehicle system 110 determines the relative sound enrichment ($E_r/Er_0$) based on the relative sharpness ($S/S_0$) according to Equation 6:

$$\frac{Er}{Er_0} = e^{-\frac{1.08S}{S_0}} \quad (6)$$

At step 308, the vehicle system 110 compares the absolute enrichment value or relative enrichment value to a predetermined enrichment threshold to determine if the motor sound is unenriched. This approach of determining enrichment based on sharpness is generally more effective for high frequency sounds than low frequency sounds, therefore this sharpness-based enrichment determination is better suited for EV vehicles or HEVs operating in EV mode because of the high-frequency traction motor noise, than for conventional vehicles with ICEs that generate relatively lower frequency engine sound.

FIG. 7A illustrates an embodiment in which the vehicle system 110 compares an absolute enrichment value, that is based on absolute sharpness as calculated in Equation 5, to an absolute threshold of 2.5 S/Accum, which is depicted by dashed line 710. FIG. 7A illustrates a baseline state sharpness curve 702 at high rotational speed that exceeds the threshold 710 after approximately 3.0 seconds.

In another embodiment the vehicle system 110 determines if the motor sound is unenriched based on inverse roughness ($R^{-1}$) alone at steps 306-308. Roughness is created by relatively quick changes in amplitude produced by modulation frequencies below 300 Hz. The vehicle system 110 determines the nominal roughness value based on the Asper scale. Relative roughness is determined by analyzing the degree of modulation and the modulation frequency for tones below 300 Hz. A roughness of 1 asper is determined to be a 1 kHz tone modulating at 70 Hz at 60 dB. The vehicle system 110 calculates the roughness (R) of the MOTOR signal based on the masking depth (L) as shown in Equation 7:

$$R = 0.3 \frac{fmod}{kHz} \int_0^{24Bark} \frac{\Delta LE(z)dz}{dB/Bark} \; asper \quad (7)$$

In other embodiments, the vehicle system 110 may use other psychoacoustically similar, but numerically different, formulations of roughness.

The masking depth (L) is the difference between the maxima and the minima in a temporal masking pattern. The vehicle system 110 determines the absolute sound enrichment (Er) based on the absolute inverse roughness ($R^{-1}$) according to the Equation 8:

$$Er = e^{-0.7 \cdot R^{-1}} \quad (8)$$

In an additional embodiment, the vehicle system 110 determines the relative enrichment ($Er/Er_0$) of the motor sound based on the relative inverse roughness ($R^{-1}/R_0^{-1}$) according to Equation 9:

$$\frac{Er}{Er_0} = e^{-\frac{0.7 R^{-1}}{R_0^{-1}}} \quad (9)$$

At step 308, the vehicle system 110 compares the absolute enrichment value or the relative enrichment value to a predetermined enrichment threshold to determine if the motor sound is unenriched. This approach of determining enrichment based on inverse roughness is generally more effective for low frequency sounds than high frequency sounds, therefore this inverse roughness-based enrichment determination is better suited for conventional vehicles with ICEs that generate low-frequency sound than for EV vehicles or HEVs operating in EV mode that generate high-frequency motor whine.

In another embodiment the vehicle system 110 determines if the motor sound is unenriched based the loudness and tonality of the motor sound at steps 306-308. As discussed above, loudness corresponds to sound intensity, and loudness influences both roughness and sharpness. The vehicle system 110 measures loudness in sones using the microphones 126. The vehicle system 110 includes a loudness threshold, e.g., 676 sones, that corresponds to the threshold of auditory pain of approximately 140 dB. Tonality refers to the tone quality of sound and is also included in the motor enrichment equation however it has minimal effect. Tonality depends neither on the critical-band rate nor on the loudness. Relative tonality, however, depends on the bandwidth expressed in critical-band-rate spread, such that it decreases with increasing critical-band-rate spread. Tonality is determined subjectively, therefore the vehicle system 110 includes predetermined data indicative of the tonality of the motor sound. The vehicle system 110 determines the absolute sound enrichment (Er) based on the absolute tonality (R) and absolute loudness (N) according to the Equation 10:

$$Er = (1.24 - e^{-2.43 \cdot T}) * e^{-(0.023 * N)^2} \quad (10)$$

In an additional embodiment, the vehicle system 10 determines the relative enrichment ($Er/Er_0$) of the motor sound based on the relative tonality ($T/T_0$) and relative loudness ($N/N_0$) according to Equation 11:

$$\frac{Er}{Er_0} = (1.24 - e^{-\frac{2.43T}{T_0}}) * e^{-(\frac{0.023N}{N_0})^2} \quad (11)$$

At step 308, the vehicle system 110 compares the relative enrichment to a predetermined enrichment threshold to determine if the motor sound is unenriched. This approach of determining enrichment based on loudness and tonality is generally effective for a wide frequency range and therefore it is applicable for both electrified vehicles (e.g., HEVs and EVs) and conventional vehicles with ICEs.

In one embodiment, the vehicle system 110 employs an equal temperament system method and adds additional "overtones" that are one, two, or more than two, octaves lower than the measured motor sound at step 310. In music and electronics, an octave is a logarithmic unit for ratios between frequencies, with one octave corresponding to a doubling or halving of frequency. Therefore, for an MOTOR signal of 800 Hz, a sub-harmonic that is one octave lower would be at 400 Hz, and a sub-harmonic that is two octaves lower would be at 200 Hz. The existence of three tones that are spaced apart by an octave may still be a harmonically sparse sound signature, and the vehicle system 110 may generate additional frequencies to achieve a consonant and enriched sound signature.

In another embodiment, the vehicle system 110 analyzes the harmonic sparseness of the motor sound to determine if it is unenriched at steps 302-308. The signal analysis module 214 (FIG. 2) includes a peak detector, according to one or more embodiments. The peak detector detects the amplitudes of each motor sound peak. In various embodiments, this analysis can be done using a microphone signal MIC, or a signal for another type of transducer. Because electric motors signature sound is that of a single frequency (sine wave), their natural sound is unenriched. Synthesized sound tones can be generated by vehicle system 110 at a frequency ratio of 0.5, which is one octave lower in frequency to decrease sparseness and increase enrichment. In an embodiment, tones are generated at a frequency ratio that corresponds to a known stable or consonant interval, e.g., a minor third, a major third, a perfect fourth, a perfect fifth, a minor sixth, a major sixth, or an octave, and so the vehicle system 110 determines that the motor sound is pleasant and enriched. However, in an embodiment, if the Equal Temperament ratio corresponds to a known unstable or dissonant interval, e.g., minor second, major second, tritone, minor seventh, or major seventh, then the vehicle system 110 determines that the motor sound is both unpleasant and unenriched.

After the vehicle system 110 determines that the motor sound is unenriched at step 308, the vehicle system 110 proceeds to step 310 and generates additional sub-harmonics of the MOTOR signal to mask the unenriched motor sound with additional synthesized sound. For example, referring to FIGS. 7A-7C, after the absolute enrichment curve 702 exceeds the threshold 710, the vehicle system 110 determines that the motor sound is unenriched and generates additional sub-harmonics as illustrated by the lower enrichment curve 704 in FIG. 7B. Then after the absolute enrichment curve 704 exceeds the threshold 710, the vehicle system 110 determines that the motor sound is still unenriched and generates additional sub-harmonics as illustrated by the lower enrichment curve 706 in FIG. 7C.

The vehicle system 110 utilizes the method 300 during steady state driving, and also during acceleration and deceleration. In one or more embodiments, the vehicle system 110 uses a sound localization algorithm, such as that described in U.S. Pat. No. 10,065,561, to localize the generated sound in the direction of the motor whine, thereby increasing the masking effect.

Vehicle occupants are accustomed to a harmonically rich sonic experience of a traditional ICE-powered vehicle. For example, a 4-cylinder ICE radiates a fundamental 2nd order, in addition to higher 4th, 6th, 8th and 16th orders. Under heavy engine load, 2.5th 4.5th orders are also generated with significant amplitude. So, vehicle occupants are accustomed to a harmonically rich engine sound signature, rather than the single tones of EV motor whine. With internal combustion engines, an order is the scaling between the engine RPM and the audible frequency generated. The analog for EV's is that an order is the scaling between the electric traction motor RPM and the audible frequency. The spacing between the dominant and lower orders creates a spacing or interval that is defined by a ratio, and corresponds to the spacing between musical notes.

An interval refers to the spacing between frequencies between a harmonic series of tones. The spacing of intervals can be broken down into whole steps and half steps to create stable or consonant tones. FIG. 4A is a scale of stable or consonant intervals between tones, including a minor third, a major third, a perfect fourth, a perfect fifth, a minor sixth, a major sixth, and an octave. FIG. 4B is a scale of unstable or dissonant intervals between tones, including a minor second, a major second, a tritone, a minor seventh, and a major seventh. The primary highest frequency tone detected by the microphones represents the subtonic or leading tone. From the leading tone the consonant intervals can be added at lower frequency based on the Equal Temperament ratio.

The only pure interval is the octave. An octave can be divided into twelve equally spaced notes or half steps on a chromatic scale and all half steps sound like the same spacing in frequency or pitch. If two notes are added within the same harmonic series of the initial detected highest order, the additional tones can complement and reinforce each other thereby presenting the human ear with consonant tones. The actual frequency of the notes does not matter but how they compare to each other, i.e., the harmonic spacing or pitch ratio, does. The equal temperament method is based on the twelfth root of two, which divides an octave into twelve equal steps, as listed in FIG. 5.

Just as different combinations of musical notes can be combined to create musical "chords" that are pleasing to the ear, the vehicle system 110 combines orders to create "chords" that are harmonically balanced during acceleration, deceleration, or steady state driving, to create a sound signature that masks or balances unwanted or unpleasant motor noise. In music theory, a major chord is a chord that has a root note, a major third note, and a perfect fifth note. For example, if a vehicle has a dominate 4th order, the vehicle system 110 may add a major 3rd note, by multiplying the frequency of the measured $4^{th}$ order sound by a factor of 1.2599, as indicated by numeral 502; and the vehicle system 110 may add a perfect 5th note by multiplying the $4^{th}$ order frequency by a factor of 1.4983, as indicated by numeral 504 such as a 5.0625 order and a 6th order respectively, to create a C chord. For EV sound creation the dominant order is much higher in frequency compared to typical engine orders. Common engine orders include frequencies below 300 Hz while electric motors typically include frequencies above ~1000 Hz. In an embodiment, only lower frequency orders are synthesized. In an embodiment, the lower synthesized orders are synthesized to create a consonant interval such as one listed in FIG. 4A, based on the frequency ratios detailed in FIG. 5.

Note that the frequency ratios specified above are the exact notes for equal temperament tuning intervals. Other tuning intervals also exist in music, such as just tuning intervals. The difference between these tuning intervals is as much as nine or ten cents or more (where a cent is $\frac{1}{100}^{th}$ of a semitone), which shows that some margin of frequency around these exact frequency ratios still result in consonant, harmonious intervals. So, useful embodiments are not limited to these exact frequency ratios.

FIGS. 6-9 illustrate examples of the impact of the method for masking high-frequency motor noise or enriching the unenriched motor sound. FIG. 6A is a graph 600 including multiple curves illustrating the natural harmonics of the motor 120 during a vehicle acceleration event as estimated by the vehicle system 110 at step 304. The motor sound includes a dominant $96^{th}$ order 602, which corresponds to 96 times the motor shaft rotational speed, along with low base orders: $24^{th}$ order, $16^{th}$ order, and $8^{th}$ order, referenced by numerals 604, 606, and 608, respectively. As illustrated in FIG. 6A, the dominant $96^{th}$ order 602 is much higher in frequency than the lower base orders.

FIGS. 7A-7C and 9 illustrate an example of the vehicle system 110 determining enrichment based on sharpness. FIG. 7A is a graph 700 including a curve 702 illustrating the natural sharpness of the motor sound over time, as determined by the vehicle system 110. As illustrated in FIG. 7A, the sharpness increases from approximately 0.25 Acum to approximately 3.5 Acum over approximately 5.5 seconds.

Figure 9:
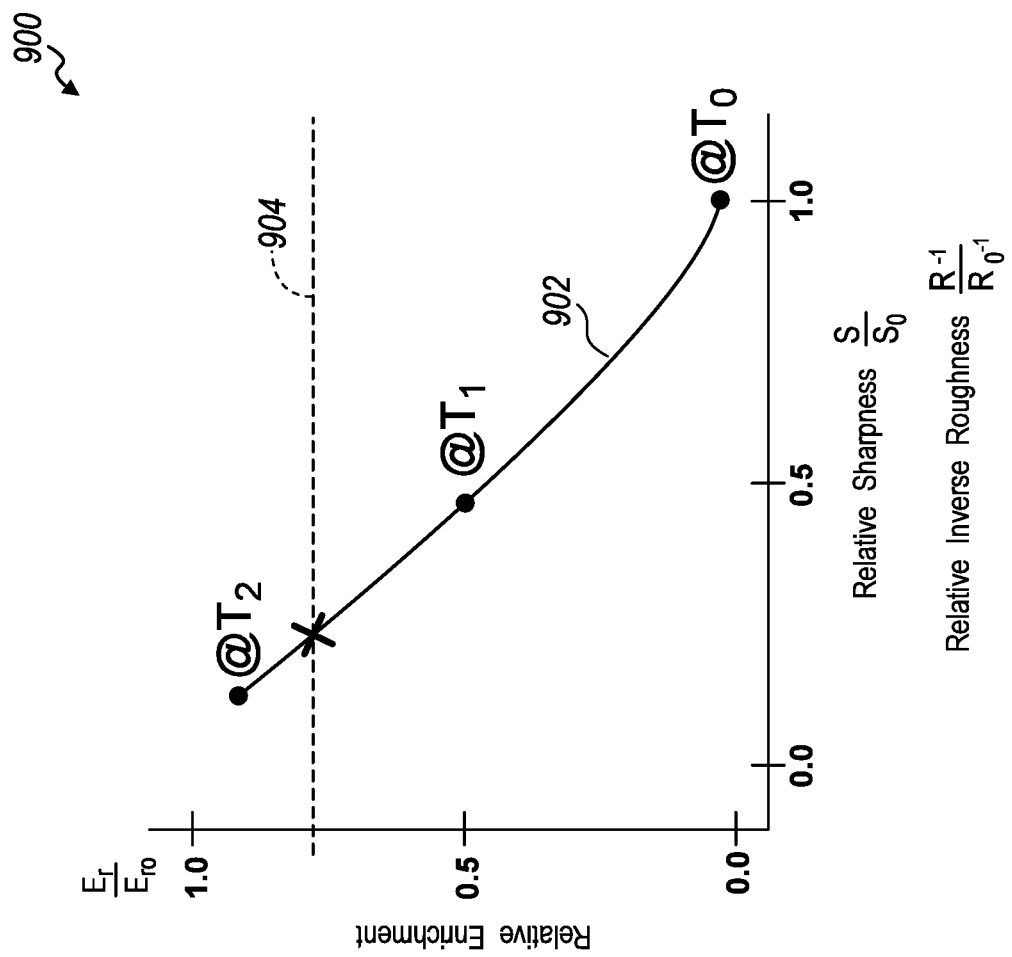
FIG. 9 is a graph of the enrichment of the motor sounds illustrated in FIGS. 6A-6C as determined by the vehicle system of FIG. 1.

FIG. 9 is a graph 900 including a curve 902 illustrating the relative enrichment of the motor sound, as determined by the vehicle system 110. The graph 900 includes relative enrichment ($Er/Er_0$) on the y-axis, and relative sharpness ($S/S_0$) on the x-axis, for sharpness-based enrichment determinations. The curve 902 represents relative enrichment as calculated using Equation 6 and dashed line 904 represents a predetermined enrichment threshold. Time $T_0$, which represents time $T_0$, on graph 700, which is the first point at which the vehicle system 110 determines sharpness (i.e., $S_0$). The relative sharpness at $T_0$ is equal to one, because the absolute sharpness (S) is equal to the nominal sharpness ($S_0$). The vehicle system 110 determines that the relative enrichment (P/$P_0$) is less than the threshold 904 at $T_0$, and then synthesizes additional motor sound.

Figure 6A:
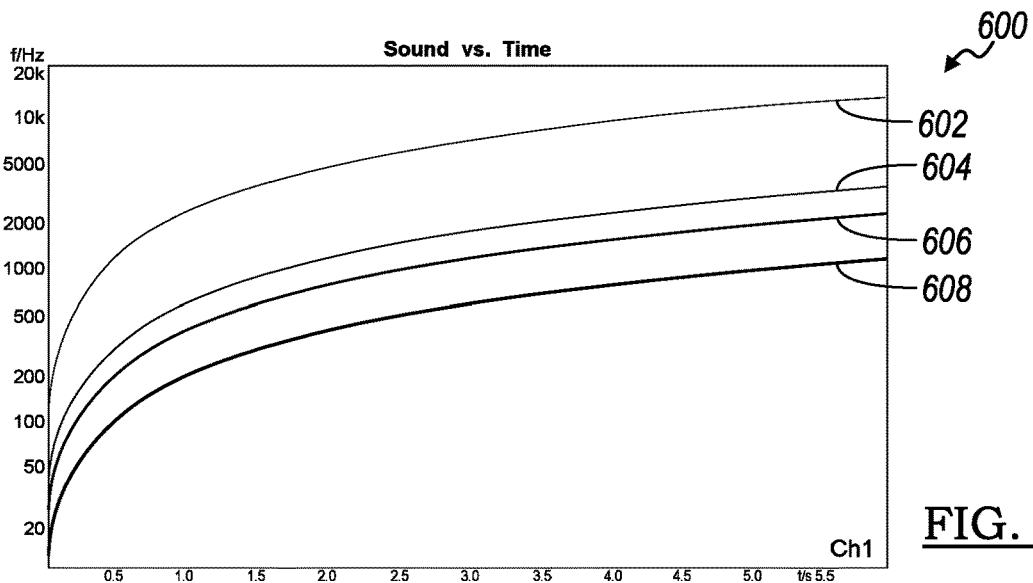
FIG. 6A is a graph illustrating the natural sound of a motor of the electrified vehicle of FIG. 1.
Figure 6B:
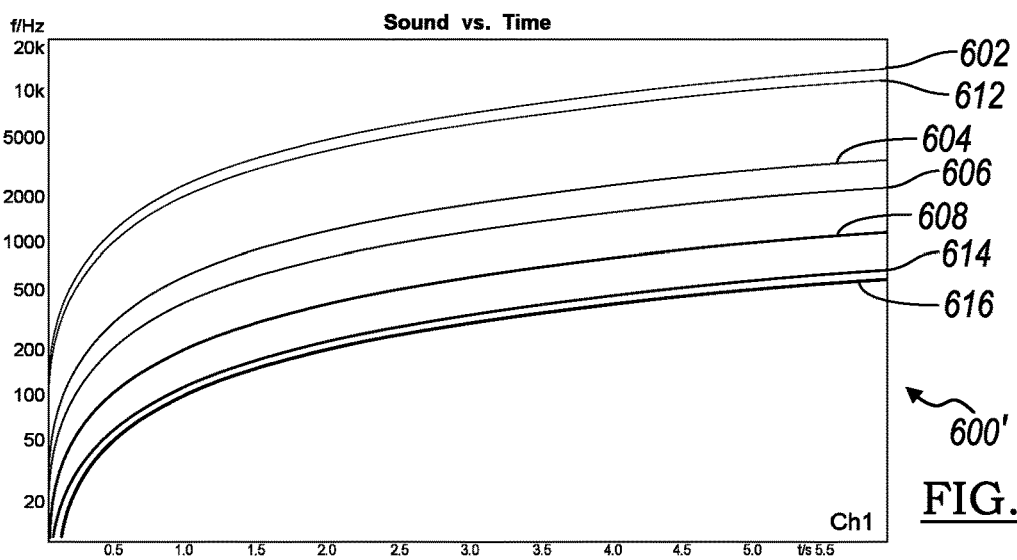
FIG. 6B is a graph illustrating the natural sound of the motor of the electrified vehicle of FIG. 6A and synthesized motor sound generated by the vehicle system of FIG. 1 according to one or more embodiments.

Referring to FIGS. 5 and 6B, the vehicle system 110 generates additional synthesized motor sound (SMS) or harmonics that are lower in frequency than the natural motor sound which are illustrated in graph 600' (FIG. 6B). The vehicle system 110 generates a Major $2^{nd}$ order lower in frequency 612 (FIG. 6B) by dividing the dominate order 602 by a factor of 1.1225, as indicated by numeral 506 in FIG. 5. The vehicle system 110 generates a 4.5 Order 614 by dividing the dominate order 602 by a factor of 1.4983, as indicated by numeral 504.

With reference to FIGS. 7B and 9, the vehicle system 110 compares the natural motor sound, combined with synthesized motor sound, to predetermined data to determine if it is still unenriched. FIG. 7B is another graph 700', including a curve 704 illustrating the sharpness of the motor sound combined with synthesized motor sound, as determined by the vehicle system 110. As illustrated in FIG. 7B, the sharpness 704 increases from approximately 0.0.3 Acum to approximately 2.9 Acum over approximately 5.5 seconds, which is less than the maximum sharpness of curve 702 in FIG. 7A. Referring to FIG. 9, the vehicle system 110 determines the relative enrichment of the motor sound illustrated in graph 600' (FIG. 6B) and graph 700' (FIG. 7B), which is referenced by time $T_1$ on the enrichment curve 902. Although the enrichment has improved from time $T_0$ to time $T_1$, the vehicle system 110 determines that the relative enrichment is still less than the threshold 904 and therefore still unenriched. Then the vehicle system 110 synthesizes additional motor sound.

Figure 6C:
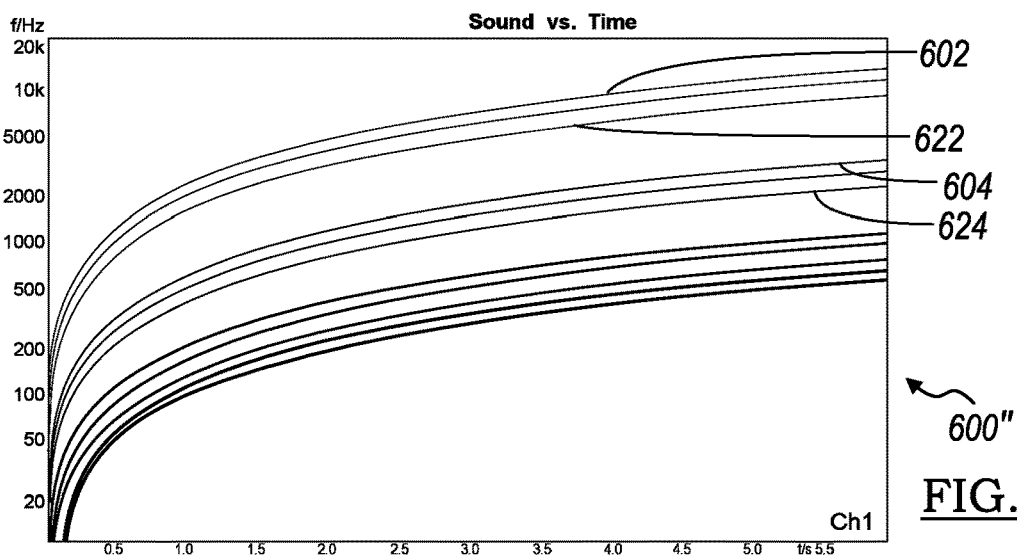
FIG. 6C is a graph illustrating the natural and synthesized motor sounds of FIGS. 6A and 6B and additional synthesized motor sound generated by the vehicle system of FIG. 1.

Referring to FIGS. 5 and 6C, the vehicle system 110 generates additional synthesized motor sound (SMS), or harmonics, that are lower in frequency than the natural motor sound which are illustrated in graph 600" (FIG. 6C). The vehicle system 110 generates a Major $3^{rd}$ order 622 by dividing the dominate order 602 by a factor of 1.2599, as indicated by numeral 502 in FIG. 5. The vehicle system 110 also generates a perfect $5^{th}$ order 624 by dividing the dominate order 602 by a factor of 1.4983, as indicated by numeral 504.

With reference to FIGS. 7C and 9, the vehicle system 110 compares the natural motor sound, combined with synthesized motor sound, to predetermined data to determine if it is still unenriched. FIG. 7C is another graph 700" including a curve 706 illustrating of the sharpness of the motor sound combined with synthesized motor sound, as determined by the vehicle system 110. As illustrated in FIG. 7C, the sharpness of curve 706 increases from approximately 0.0.3 Acum to approximately 2.5 Acum over approximately 5.5 seconds, which is less than the maximum sharpness of curve 704 in FIG. 7B.

Figures 8A, 8B, 8C:
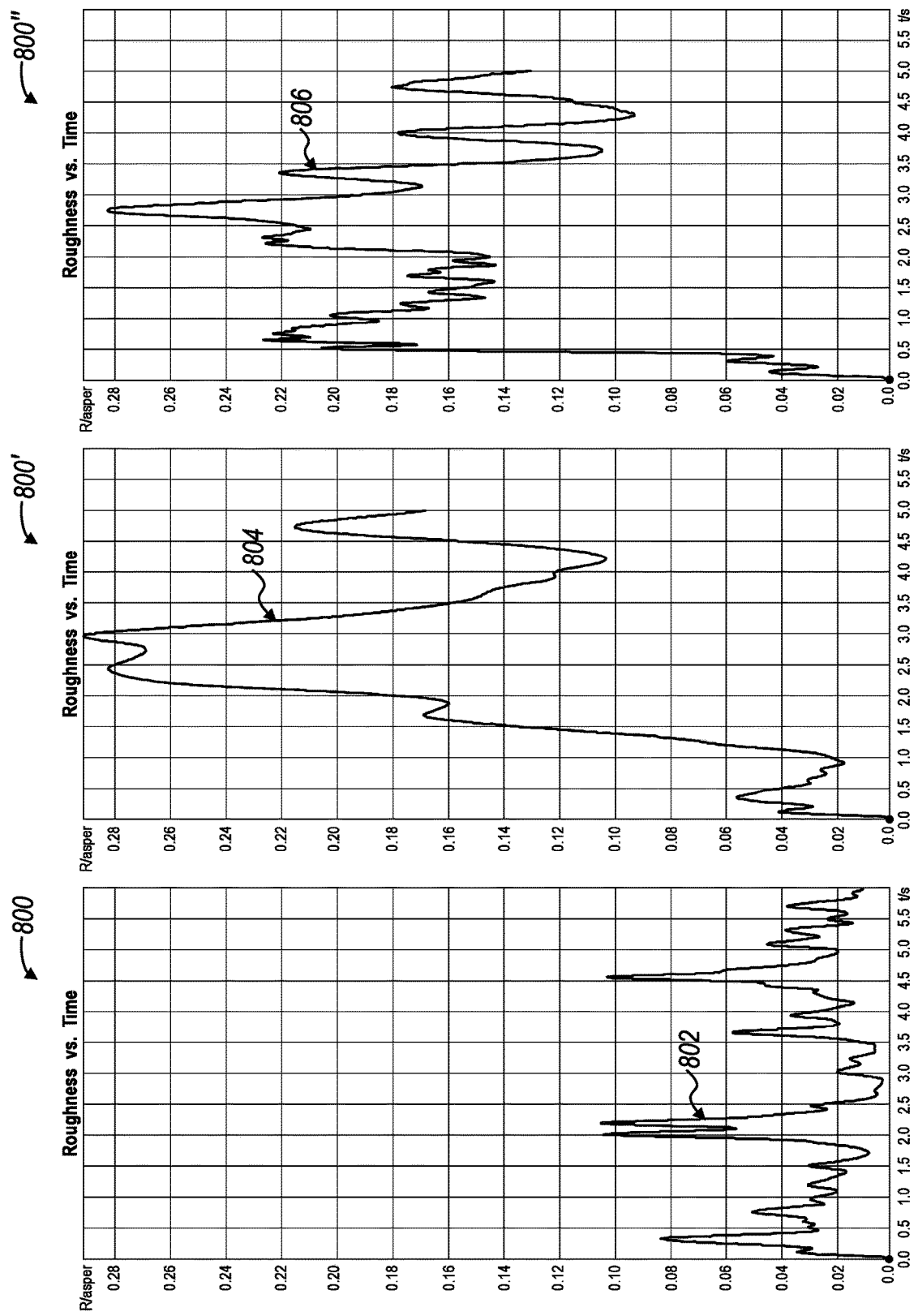
FIGS. 8A-8C are graphs illustrating the roughness of the motor sounds illustrated in FIGS. 6A-6C as determined by the vehicle system of FIG. 1.

Referring to FIG. 9, the vehicle system 110 determines the relative enrichment of the motor sound illustrated in FIGS. 6C and 8C, which is referenced by Time $T_2$ on the enrichment curve 902. The vehicle system 110 determines that the relative enrichment is greater than the threshold 904, i.e. not unenriched (or enriched), which results in a negative determination at step 308, and therefore the vehicle system 110 does not generate additional motor sound harmonics, rather it returns to step 302.

In other embodiments, the vehicle system 110 determines enrichment based on inverse roughness. FIGS. 8A-8C and 9 illustrate an example of the vehicle system 110 determining enrichment based on inverse roughness. FIG. 8A is a graph 800 including a curve 802 illustrating the natural roughness of the motor sound, as determined by the vehicle system 110. As illustrated in graph 800 (FIG. 8A), the roughness increases from approximately 0.00 Asper to approximately 0.10 Asper over approximately 5.5 seconds.

FIG. 9 is a graph 900 of the relative enrichment of the motor sound, as determined by the vehicle system 110. The graph 900 includes relative enrichment (Er/$Er_0$) on the y-axis, and now, for this embodiment, the x-axis of FIG. 9 corresponds to relative inverse roughness ($R^{-1}/R_0^{-1}$). The curve 902 now represents relative enrichment as calculated using Equation 9 and dashed line 904 represents a predetermined enrichment threshold. Time $T_0$, which represents time $T_0$, on graph 800, which is the first point at which the vehicle system 110 determines inverse roughness (i.e., $R_0^{-1}$). The relative inverse roughness at $T_0$ is equal to one, because the absolute inverse roughness ($R^{-1}$) is equal to the nominal inverse roughness ($R_0^{-1}$). The vehicle system 110 determines that the enrichment is less than the threshold 904 at $T_0$, and then synthesizes additional motor sound.

Referring to FIGS. 5 and 6B, the vehicle system 110 generates additional motor harmonics that are lower in frequency than the natural motor sound. The vehicle system 110 generates a Major $2^{nd}$ order 612 (FIG. 6B) by dividing the dominate order 602 by a factor of 1.1225, as indicated by numeral 506 in FIG. 5. The vehicle system 110 generates a 4.5 Order 614 by dividing the dominate order 602 by a factor of 1.4983, as indicated by numeral 504.

With reference to FIGS. 8B, and 9 the vehicle system 110 compares the natural motor sound, combined with synthesized motor sound, to predetermined data to determine if it is still unenriched. FIG. 8B is another graph 800' including a curve 804 illustrating the roughness of the natural motor sound combined with synthesized motor sound, as determined by the vehicle system 110. As illustrated in FIG. 8B, the roughness curve 804 increases from approximately 0.00 Asper to approximately 0.29 Asper, which is greater than the maximum roughness of curve 802 in FIG. 8A.

Referring to FIG. 9, the vehicle system 110 determines the relative enrichment of the motor sound illustrated in FIGS. 6B and 8B, which is referenced by time $T_1$ on the enrichment curve 902. Although the enrichment has improved from $T_0$ to $T_1$, the vehicle system 110 determines that the relative enrichment is still less than the threshold 904 and therefore still unenriched. Then the vehicle system 110 synthesizes additional motor sound.

Referring to FIGS. 5 and 6C, the vehicle system 110 generates additional motor harmonics that are lower in frequency than the natural motor sound. The vehicle system 110 generates a Major $3^{rd}$ order 622 by dividing the dominate order 602 by a factor of 1.2599, as indicated by numeral 502. The vehicle system 110 generates a perfect $5^{th}$ order 624 by dividing the dominate order 602 by a factor of 1.4983, as indicated by numeral 512.

With reference to FIGS. 8C and 9, the vehicle system 110 compares the natural motor sound, combined with synthesized motor sound, to predetermined data to determine if it is still unenriched (or enriched). FIG. 8C is another graph 800" including a curve 806 illustrating the roughness of the natural motor sound combined with synthesized motor sound, as determined by the vehicle system 110. As illustrated in FIG. 8C, the roughness 806 increases from approximately 0.00 Asper to approximately 0.28 Asper over approximately 5.5 seconds, which is similar to the maximum roughness of curve 802 in FIG. 8A.

Referring to FIG. 9, the vehicle system 110 determines the relative enrichment of the motor sound illustrated in FIGS. 6C and 8C, which is referenced by Time $T_2$ on the enrichment curve 902. The vehicle system 110 determines that the relative enrichment is now greater than the threshold 904, i.e. not unenriched (or enriched), which results in a negative determination at step 308, and therefore the vehicle system 110 does not generate additional motor sound harmonics, rather it returns to step 302.

In another embodiment, the vehicle system 110 uses a Pythagorean tuning method (not shown) to add additional orders based on interval of the pure fifth. Pure intervals are the ones found in the harmonic series, with very simple frequency ratios. A pure fifth will have a frequency ratio of 3:2.

In another embodiment, the vehicle system 110 uses a Mean-tone system method (not shown) to add additional order. In order to create enriched intervals, the vehicle system 110 uses the pure major thirds consisting of major and minor intervals. The whole tone is considered to be exactly half of the pure major third and a semitone is exactly half of a whole tone.

While exemplary embodiments are described above, it is not intended that these embodiments describe all possible forms. Rather, the words used in the specification are words of description rather than limitation, and it is understood that various changes may be made without departing from the spirit and scope of the disclosure. Additionally, the features of various implementing embodiments may be combined to form further embodiments.

Additionally, the components and/or elements recited in any apparatus claims may be assembled or otherwise operationally configured in a variety of permutations and are accordingly not limited to the specific configuration recited in the claims. Functionally equivalent processing steps can be undertaken in either the time or frequency domain. Accordingly, though not explicitly stated for each signal processing block in the figures the signal processing may occur in either the time domain, the frequency domain, or a combination thereof. Moreover, though various processing steps are explained in the typical terms of digital signal processing performed in a processor, equivalent steps may be performed using analog signal processing without departing from the scope of the present disclosure. Benefits, advantages and solutions to problems have been described above with regard to particular embodiments. However, any benefit, advantage, solution to problems or any element that may cause any particular benefit, advantage or solution to occur or to become more pronounced are not to be construed as critical, required or essential features or components of any or all the claims.

What is claimed is:

1. A sound synthesis system comprising:
   a loudspeaker to project sound indicative of synthesized motor sound within a passenger compartment of a vehicle in response to receiving a synthesized sound (SS) signal; and
   a processor programmed to:
      estimate motor sound based on a sensor signal indicative of sound present within the passenger compartment;
      identify a dominant motor harmonic of the motor sound with an amplitude and a frequency;
      determine an enrichment value of the motor sound;
      determine if the motor sound is unenriched based on a comparison of the enrichment value to an enrichment threshold value;
      generate at least one additional motor harmonic with a first frequency that is different than the frequency of the dominant motor harmonic in response to the motor sound being unenriched; and
      provide the SS signal to the loudspeaker, wherein the SS signal is indicative of the at least one additional motor harmonic.

2. The sound synthesis system of claim 1, wherein the processor is further programmed to generate a first additional motor harmonic with the first frequency and a second additional motor harmonic with a second frequency in response to the motor sound being unenriched, and wherein the first frequency is less than the frequency of the dominant motor harmonic by one octave, and the second frequency is less than the frequency of the dominant motor harmonic by at least two octaves.

3. The sound synthesis system of claim 1, wherein the processor is further programmed to generate a first additional motor harmonic with the first frequency and a second additional motor harmonic with a second frequency in response to the motor sound being unenriched, and wherein the first frequency is less than the frequency of the dominant motor harmonic by one octave, and the second frequency is less than the frequency of the dominant motor harmonic by at least one octave, wherein the motor sound and the synthesized motor sound present in the passenger compartment collectively provide a musical chord.

4. The sound synthesis system of claim 3, wherein the processor is further programmed to estimate the motor sound by filtering at least one of an audio signal and a synthesized engine signal from the sensor signal.

5. The sound synthesis system of claim 1, wherein the enrichment value comprises an absolute enrichment value of the motor sound, and wherein the processor is further programmed to:
   determine an absolute sharpness value of the motor sound;
   determine the absolute enrichment value of the motor sound, based on the absolute sharpness value;
   determine if the motor sound is unenriched based on a comparison of the absolute enrichment value to the enrichment threshold value; and
   provide the SS signal to the loudspeaker in response to the absolute enrichment value not exceeding the enrichment threshold value.

6. The sound synthesis system of claim 1, wherein the enrichment value comprises an absolute enrichment value of the motor sound, and wherein the processor is further programmed to:
   determine an absolute inverse roughness value of the motor sound;
   determine the absolute enrichment value of the motor sound, based on the absolute inverse roughness value;
   determine if the motor sound is unenriched based on a comparison of the absolute enrichment value to the enrichment threshold value; and
   provide the SS signal to the loudspeaker in response to the absolute enrichment value not exceeding the enrichment threshold value.

7. The sound synthesis system of claim 1, wherein the enrichment value comprises an absolute enrichment value of the motor sound, and wherein the processor is further programmed to:
   determine an absolute loudness value of the motor sound;

determine an absolute tonality value of the motor sound;
determine the absolute enrichment value of the motor sound, based on the absolute loudness value and the absolute tonality value;
determine if the motor sound is unenriched based on a comparison of the absolute enrichment value to the enrichment threshold value; and
provide the SS signal to the loudspeaker in response to the absolute enrichment value not exceeding the enrichment threshold value.

8. The sound synthesis system of claim 1, wherein the enrichment value comprises an absolute enrichment value of the motor sound, and wherein the processor is further programmed to:
determine at least one of an absolute sharpness value, an absolute roughness value, an absolute loudness value, and an absolute tonality value of the motor sound;
determine an absolute enrichment value of the motor sound, based on the at least one absolute value of the motor sound;
determine if the motor sound is unenriched based on a comparison of the absolute enrichment value to the enrichment threshold value; and
provide the SS signal to the loudspeaker in response to the absolute enrichment value not exceeding the enrichment threshold value.

9. A vehicle sound synthesis system comprising:
a loudspeaker to project sound indicative of synthesized motor sound within a passenger compartment of a vehicle in response to receiving a synthesized sound (SS) signal;
a microphone to provide a microphone signal indicative of sound present within the passenger compartment; and
a controller configured to:
estimate motor sound based on the microphone signal;
identify a dominant motor harmonic of the motor sound with an amplitude and a frequency;
determine an enrichment value of the motor sound;
determine if the motor sound is unenriched based on a comparison of the enrichment value of the motor sound to an enrichment threshold value;
generate at least one additional motor harmonic with a first frequency that is less than the frequency of the dominant motor harmonic in response to the motor sound being unenriched; and
provide the SS signal to the loudspeaker, wherein the SS signal is indicative of the at least one additional motor harmonic.

10. The vehicle sound synthesis system of claim 9, wherein the controller is further configured to:
generate a first additional motor harmonic with the first frequency and a second additional motor harmonic with a second frequency, in response to the motor sound being unenriched; and
wherein the first frequency is less than the frequency of the dominant motor harmonic by at least one octave, and the second frequency is less than the frequency of the dominant motor harmonic by at least one octave.

11. The vehicle sound synthesis system of claim 10, wherein the controller is further configured to generate the first additional motor harmonic and the second additional motor harmonic such that the motor sound and the synthesized motor sound present in the passenger compartment collectively provide a musical chord.

12. The vehicle sound synthesis system of claim 9, wherein the enrichment value comprises a relative enrichment value of the motor sound, and wherein the controller is further configured to:
determine a relative sharpness value of the motor sound;
determine the relative enrichment value of the motor sound based on the relative sharpness value;
compare the relative enrichment value to the enrichment threshold value to determine if the motor sound is unenriched; and
provide the SS signal to the loudspeaker in response to the relative enrichment value not exceeding the enrichment threshold value.

13. The vehicle sound synthesis system of claim 9, wherein the enrichment value comprises a relative enrichment value of the motor sound, and wherein the controller is further configured to:
determine a relative inverse roughness value of the motor sound;
determine the relative enrichment value of the motor sound, based on the relative inverse roughness value;
compare the relative enrichment value to the enrichment threshold value to determine if the motor sound is unenriched; and
provide the SS signal to the loudspeaker in response to the relative enrichment value not exceeding the enrichment threshold value.

14. The vehicle sound synthesis system of claim 9, wherein the enrichment value comprises a relative enrichment value of the motor sound, and wherein the controller is further configured to:
determine a relative loudness value of the motor sound;
determine a relative tonality value of the motor sound;
determine the relative enrichment value of the motor sound, based on the relative loudness value and the relative tonality value;
compare the relative enrichment value to the enrichment threshold value to determine if the motor sound is unenriched; and
provide the SS signal to the loudspeaker in response to the relative enrichment value not exceeding the enrichment threshold value.

15. The vehicle sound synthesis system of claim 9, wherein the enrichment value comprises a relative enrichment value of the motor sound, and wherein the controller is further configured to:
determine at least one of a relative sharpness value, a relative roughness value, a relative loudness value, and a relative tonality value of the motor sound;
determine a relative enrichment value of the motor sound, based on the at least one relative value of the motor sound;
compare the relative enrichment value to the enrichment threshold value to determine if the motor sound is unenriched; and
provide the SS signal to the loudspeaker in response to the relative enrichment value not exceeding the enrichment threshold value.

16. A computer-program product embodied in a non-transitory computer readable medium that is programmed to synthesize motor sound, the computer-program product comprising instructions for:
receiving a sensor signal indicative of sound present within a vehicle passenger compartment;
estimating motor sound based on the sensor signal;
identifying a dominant motor harmonic of the motor sound with an amplitude and a frequency;

generating at least one additional motor harmonic with a first frequency that is less than the frequency of the dominant motor harmonic in response to the motor sound being unenriched; and providing a synthesized sound (SS) signal to a loudspeaker to project as sound within the vehicle passenger compartment, wherein the SS signal is indicative of the at least one additional motor harmonic.

17. The computer-program product of claim 16, further comprising instructions for:

generating a first additional motor harmonic with the first frequency and a second additional motor harmonic with a second frequency, in response to the motor sound being unenriched, wherein the first frequency is less than the frequency of the dominant motor harmonic by at least one octave, and the second frequency is less than the frequency of the dominant motor harmonic by at least two octaves.

18. The computer-program product of claim 17, further comprising instructions for:

generating the first additional motor harmonic and the second additional motor harmonic such that the motor sound and the synthesized motor sound present in the passenger compartment collectively provide a musical chord.

19. The computer-program product of claim 16, further comprising instructions for:

determining at least one of an absolute value and a relative sharpness value of the motor sound;

determining at least one of an absolute enrichment value and a relative enrichment value of the motor sound, based on the at least one of the absolute value and the relative sharpness value;

comparing the at least one of the absolute enrichment value and the relative enrichment value to an enrichment threshold value to determine if the motor sound is unenriched; and providing the SS signal to the loudspeaker in response to the at least one of the absolute enrichment value and the relative enrichment value not exceeding the enrichment threshold value.

20. The computer-program product of claim 16, further comprising instructions for:

determining at least one of a relative or absolute sharpness value, a relative or absolute roughness value, a relative or absolute loudness value, and a relative or absolute tonality value of the motor sound;

determining a relative or absolute enrichment value of the motor sound, based on the at least one relative or absolute value of the motor sound;

comparing the relative or absolute enrichment value to an enrichment threshold value to determine if the motor sound is unenriched; and providing the SS signal to the loudspeaker in response to the relative or absolute enrichment value not exceeding the enrichment threshold value.

* * * * *